(12) United States Patent
Powell et al.

(10) Patent No.: US 8,819,922 B2
(45) Date of Patent: Sep. 2, 2014

(54) METHOD OF MAKING AN ELECTRICALLY-HEATED HOSE ASSEMBLY

(75) Inventors: Steven M. Powell, Chardon, OH (US); Mark G. Silber, Beachwood, OH (US); Ty A. Henry, Atwater, OH (US); Gerald F. Edwards, Atwater, OH (US); James L. Johnston, Canton, OH (US); Thomas B. Lininger, Mantua, OH (US); Matthew R. Peter, Hudson, OH (US); William C. Fisher, Cuyahoga Falls, OH (US); Nick A. Martino, Wadsworth, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 233 days.

(21) Appl. No.: 13/510,142

(22) PCT Filed: Jan. 7, 2011

(86) PCT No.: PCT/US2011/020452
§ 371 (c)(1),
(2), (4) Date: May 16, 2012

(87) PCT Pub. No.: WO2011/085154
PCT Pub. Date: Jul. 14, 2011

(65) Prior Publication Data
US 2012/0234421 A1 Sep. 20, 2012

Related U.S. Application Data

(60) Provisional application No. 61/293,235, filed on Jan. 8, 2010.

(51) Int. Cl.
*H05B 3/00* (2006.01)
*F16L 53/00* (2006.01)
*F16L 25/01* (2006.01)
*H05B 3/58* (2006.01)
*F01N 3/20* (2006.01)

(52) U.S. Cl.
CPC ............... *H05B 3/58* (2013.01); *F01N 3/2066* (2013.01); *F16L 53/008* (2013.01); *F01N 2610/02* (2013.01); *F01N 2610/14* (2013.01); *F16L 25/01* (2013.01); *F01N 2610/10* (2013.01)
USPC .................. 29/611; 29/428; 29/613

(58) Field of Classification Search
USPC ............... 29/611, 428, 613, 621, 726, 726.5, 29/890.032; 123/572; 138/33; 439/98
See application file for complete search history.

(56) References Cited

U.S. PATENT DOCUMENTS

| 5,791,377 A | 8/1998 | LaRochelle |
| 7,263,984 B2 * | 9/2007 | Wade et al. .................... 123/572 |

(Continued)

FOREIGN PATENT DOCUMENTS

| EP | 1 779 020 B1 | 5/2009 |
| FR | 2 924 786 A1 | 12/2007 |

(Continued)

OTHER PUBLICATIONS

Notification of Transmittal of the International Search Report and the Written Opinion of the International Searching Authority, or the Declaration, dated Mar. 17, 2011, in corresponding International Application PCT/US2011/020452.

(Continued)

*Primary Examiner* — Thiem Phan
(74) *Attorney, Agent, or Firm* — John A. Molnar, Jr.

(57) ABSTRACT

Electrically-heated hose assembly including a hose and a first and a second fitting. The hose is constructed as having a core tube, a pair of spiral wound wires surrounding the core, and a jacket surrounding the core tube. A first end of each of the fittings is within a corresponding end of the hose, with a second end of the fittings extending beyond the hose end. The wires are wound around at least a portion of the second fitting end of a corresponding one of the fittings.

11 Claims, 5 Drawing Sheets

(56) References Cited

U.S. PATENT DOCUMENTS

| | | | |
|---|---|---|---|
| 7,857,645 B2 * | 12/2010 | Dude et al. .................. | 439/191 |
| 2010/0263740 A1 | 10/2010 | Borgmeier et al. | |
| 2010/0290764 A1 | 11/2010 | Borgmeier et al. | |

FOREIGN PATENT DOCUMENTS

| WO | 03 021087 A1 | 3/2003 |
|---|---|---|
| WO | 2006 151924 A2 | 12/2006 |
| WO | 2008 023021 A1 | 2/2008 |
| WO | 2008 131993 A1 | 11/2008 |
| WO | 2009 003858 A1 | 1/2009 |
| WO | 2010 057819 A1 | 5/2010 |

OTHER PUBLICATIONS

Written Opinion of the International Preliminary Examining Authority, dated Dec. 15, 2011, in corresponding International Application PCT/US2011/020452.

* cited by examiner

METHOD OF MAKING AN ELECTRICALLY-HEATED HOSE ASSEMBLY

BACKGROUND OF THE INVENTION

The present invention relates broadly to an electrically-heated hose assembly, and more particularly to such an assembly for use in transferring a urea, i.e., carbamide, solution in a diesel engine emissions after-treatment system.

Selective catalytic reduction (SCR) is a method of converting nitrogen oxides ($NO_x$) into diatomic nitrogen ($N_2O$) and water with the aid of an emission reduction reagent such as urea. SCR is used to reduce emissions in diesel engines such as for ships, locomotives, gas turbines, and trucks.

SCR systems inject a liquid urea solution or other catalyst into a stream or flue of exhaust gas. The exhaust gas is absorbed into the urea solution whereupon the nitrogen oxides ($NO_x$) in the gas are converted into diatomic nitrogen by means of a chemical reaction The basic components of a urea-based SCR system, such as may be used on a heavy duty truck for example, are a urea solution tank, pressure regulators, a control unit, temperature sensors, a dosing module, and a pump. To link these components for the purpose of transferring urea through the system, flexible hose assemblies are employed. Many of these assemblies use plastic-bodied quick-connect fittings, such as specified in Society of Automotive Engineers (SAE) Standard J2044, to allow for the assembly and disassembly of the system components.

A common problem of urea-based SCR systems is the relatively high freezing point of the urea solution. The freezing temperature of urea is about +13° F. (−10.6° C.). When freezing occurs, the SCR system is rendered non-operational because the urea catalyst solidifies and cannot be pumped through the hose assemblies into the exhaust stream. Since it is not unusual to encounter temperatures of +13° F. (−10.6° C.) and below in many northern climes, urea-based SCR systems typically are designed with heated hoses and other types of heaters to maintain the temperature of the urea solution above +13 F. SCR systems and components are further described, for example, in U.S. Pat. Nos. 7,578,321; 5,976,475; and in EP 1,937,946; and WO 2007/032033. Heated hoses of general types are shown, for example, in U.S. Pat. Nos. 6,738,566; 6,727,481; 5,910,266; 5,791,377; 5,511,530; 5,428,706; 4,815,769; 4,553,023; 4,455,474; 4,372,279; 4,038,519; 3,355,572; and 3,522,413.

As applications for urea-based SCR systems continue to increase, it is believed that improvements in electrically-heated hose constructions would be well-received. Especially desired would be a construction which is flexible and lightweight, and which is economical to manufacture.

BROAD STATEMENT OF THE INVENTION

The present invention is directed to an electrically-heated hose assembly. More particularly, the invention is directed to such an assembly for use in transferring a urea, i.e., carbamide, solution in a diesel engine emissions after-treatment system.

The assembly includes a length of hose or tubing which may be cut or otherwise sectioned from a longer length. Such hose may be constructed of inner tube or core formed of one or more polymeric layers. The core may be surrounded at least one pair of plastic-coated copper, aluminum, or other electrical wires which may be spiral wound around the core. The electrical wires, in turn, may be surrounded by an outermost jacket formed of one or more polymeric layers.

With the length of hose being cut incrementally longer than the actual length specified or otherwise needed, the cover may skived back to that length at each end of the hose to recover the free ends of the wires. With the core next being cut to length at each end, the barbed or other nipple end of a push-in fitting may be inserted into each end of the hose. The recovered wires then may be spiral wound around the body of the fitting protruding from the hose at each end. Depending on which end of the hose is being constructed, the ends of the wires may be connected together at one end to complete the electrical circuit of the assembly, and left free at the other for connection to a source of electrical power. Lastly, a plastic sleeve may be overmolded or otherwise formed over the fitting body at each end to encapsulate the wires which have been spiral wound over the body.

The present invention, accordingly, comprises the construction, combination of elements, and/or arrangement of parts and steps which are exemplified in the detailed disclosure to follow. Advantageously, by winding the recovered wires around the fitting body, conventional push-in fitting types, such as SAE J2044, may be heated without the necessity and expense of having to provide specially-designed heated fittings. Moreover, by changing the incrementally longer length of the hose from which the final length is cut, the length of the wires recovered may be varied to allow for more or fewer turns over the fitting body. In this way, or by simply cutting the recovered wires to shorten them, the amount of heat input to the fitting vis-à-vis that into the hose may be controlled without having to provide separate heated fittings of different wattages. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
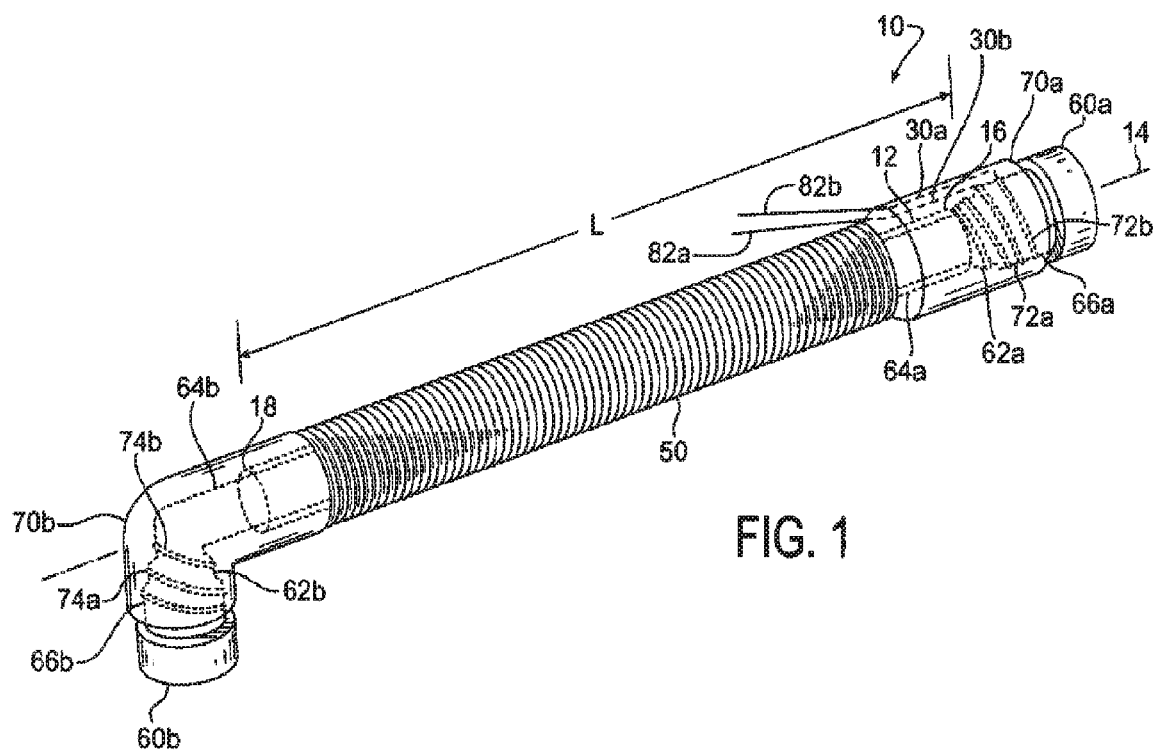
FIG. 1 is a perspective view of a representative electrically-heated hose and fitting assembly according to the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner,"

"interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustration purposes, the precepts of the electrically-heated hose assembly construction herein involved are described in connection with its configuration as particularly adapted for use in conveying a urea solution in an SCR system or other diesel engine or vehicular emissions after-treatment system. It will be appreciated, however, that aspects of the present invention may find use in other fluid transfer applications. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, a representative electrically-heated hose construction according to the present invention is shown generally at 10 in the perspective view of FIG. 1. In basic construction, assembly 10 includes a hose, referenced in phantom at 12, which extends axially along a central longitudinal axis, 14, to a predetermined length, referenced at "L," between a first hose end, 16, and a second hose end, 18. The length L of hose 12, which also may be considered to be the length of the assembly 10, may range, for example, from about 0.2 m to about 10 m or more.

Figure 2:
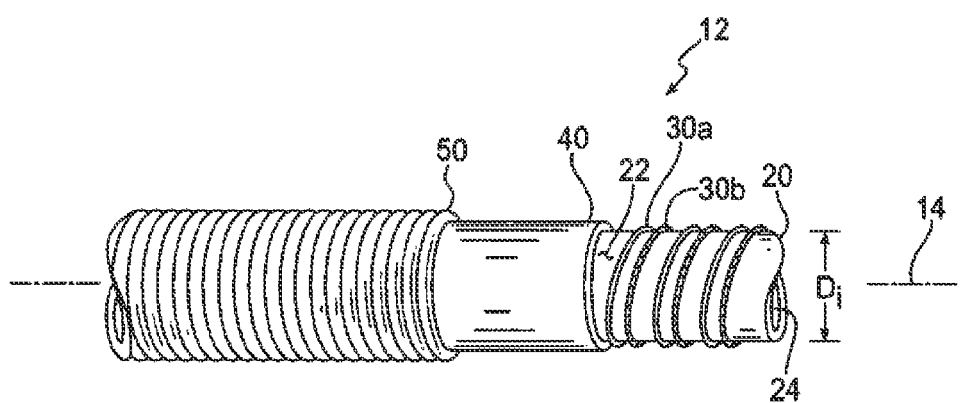
FIG. 2 is a side elevational cut-away view of the hose of the assembly of FIG. 1.

With momentary reference to the side elevational cut-away view depicted in FIG. 2, hose 12 may be formed about an innermost core tube, 20, which may be of a single or multi-layer construction. In either construction, core tube 20 has a circumferential outer core tube surface, 22, and a circumferential inner core tube surface, 24, which defines the inner diameter, referenced at $D_i$, of hose 12. Core tube 20 may be provided as molded, extruded or otherwise formed of a polymeric material such as a polyamide, polyester, polyacetal, ethylene vinyl alcohol, polyoxymethylene, polyolefin, silicone, fluoropolymer, polyvinyl chloride, polyurethane, thermoplastic elastomer, EPDM, natural or synthetic rubber, or a copolymer or blend thereof. In the case of a core tube 20 being formed of two or more layers, each of such layers may be independently formed of a polymeric material.

Depending upon the amount of heat input required, at least a pair of electrical wires, 30*a-b*, are provided to surround the core tube 20. Such wires 30 may be a stainless or carbon steel alloy, or another metal or metal alloy, and may be sheathed within a plastic or other polymeric coating to provide corrosion resistance and electrical isolation. As shown, the wires 30 may be spiral, i.e., helically, wound in parallel pairs. Preferably, the wires 30 are wound at a uniform pitch and pitch angle to ensure a uniform spacing between the turns for more even heat distribution. It will be appreciated that by varying the number of wire pairs, or by changing the pitch or pitch angle, and/or the wire gauge or type, the amount of heat input into the hose may be adjusted to provide a specified watts per meter rating and/or thaw time.

The wires 30 are sheathed within one or more layers of a coaxially-surrounding protective cover or jacket, referenced at 40. Depending upon its construction, jacket 40 may be spray-applied, dip coated, cross-head or co-extruded, or otherwise conventionally extruded, spiral or longitudinally, i.e., "cigarette," wrapped, or braided over the wires 40 to both protect the wire and to mechanically lock them in place. Each of the layers forming jacket 40 may be formed, independently, of a polymeric material such as a polyamide, polyester, polyacetal, ethylene vinyl alcohol, polyoxymethylene, polyolefin, silicone, fluoropolymer, polyvinyl chloride, polyurethanes, thermoplastic elastomer, EPDM, natural or synthetic rubber, or a copolymer or and blend thereof.

Separate reinforcement, electrically-conductive fiber, or additional resin layers (not shown) which, depending on the layer, may be wound, wrapped, or braided, also may be included in the construction of hose 12 as disposed between the core tube 20 and the jacket 40. The entire hose 12 may be sheathed within a wire-loop or corrugated plastic or other guard, 50, as an added protective layer.

Returning to FIG. 1, a first and a second fitting, 60*a-b*, each is connected to a corresponding end 16 or 18, respectively, of hose 12. Each of the fittings 60 may be straight, as shown for fitting 60*a*, or angled, as is shown for fitting 60*b*. Each of the fittings 60, independently, may be of an SAE J2044 push-in style as shown or other quick-connect or other type such as compression or crimped, and may include metal or polymeric seals.

As may be seen in phantom in FIG. 1, each of the fittings 60 have a generally tubular body, 62*a-b*, which may be formed of a plastic, having a first fitting end, 64*a-b*, and an opposite second fitting end, 66*a-b*. Each of the first fitting ends 64*a-b*, which may be a barb, nipple, or other male end-form, is inserted into the inner diameter $D_i$ of hose 12 at a corresponding one of the first or second hose ends 16 or 18. Each of the second fitting ends 66*a-b*, in turn, extends axially beyond the corresponding one of the hose ends 16 or 18. The second fitting ends may be of a female coupler end-form for a snap-to-connect or other push-in connection with an associated nipple connector (not shown).

The hose ends 16 and 18, along with a portion of the second fittings ends 64*a-b*, each may be encased within a plastic overmolding or other type sleeve, 70*a-b*. Wires 30*a-b* each are provided as having a length of a first wire end, 72*a-b*, adjacent the first hose end 16 and a length of a second wire end 74*a-b* adjacent the second hose end 18, with each of these lengths being longer than the adjacent hose end. In this way, at least a portion of the lengths 72 and 74 may be wound around at least a portion of the second fitting end 66-b of a corresponding one of the first and the second fittings 60a-b to thereby heat the fittings.

Figure 3:
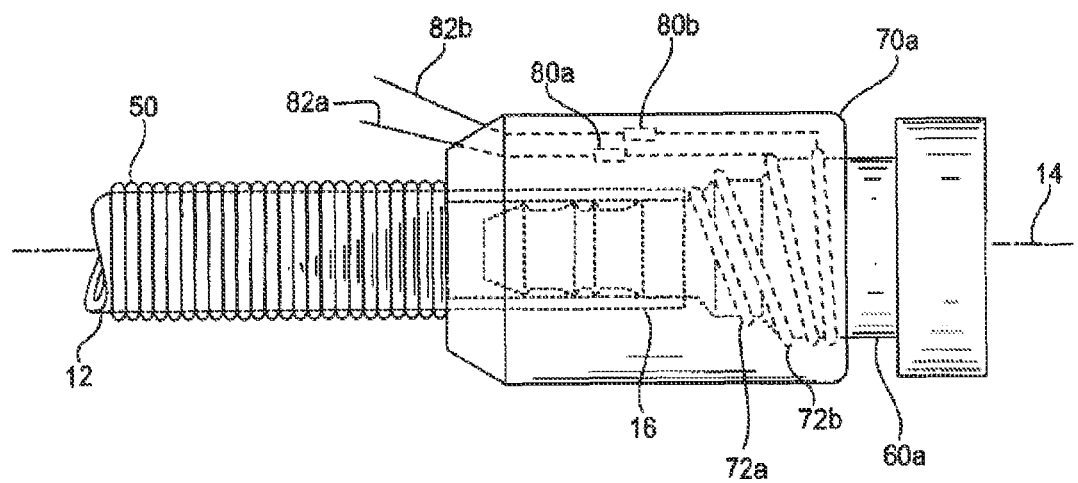
FIG. 3 is a side elevational detail view of one end of the assembly of FIG. 1 with some of the components thereof being shown as transparent or in phantom to reveal certain details otherwise being hidden from view.
Figure 4:
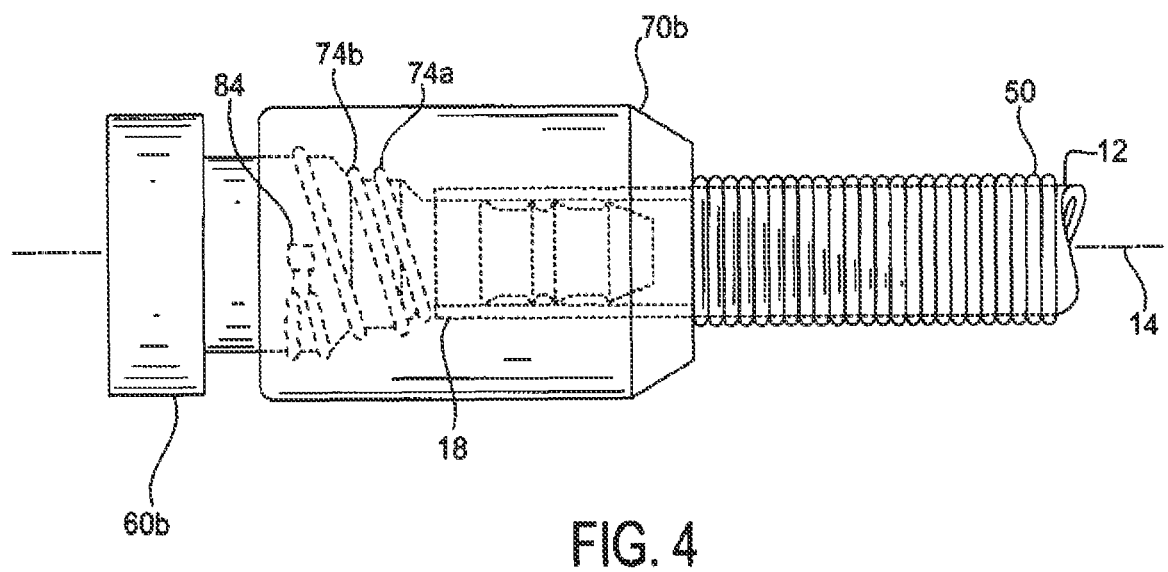
FIG. 4 is a side elevational detail view of the other end of the assembly of FIG. 1 with some of the components thereof being shown as transparent or in phantom to reveal certain details otherwise being hidden from view.

Turning to FIG. 3 wherein sleeve 70a and the associated hose end 16 and fitting 60a are shown in enhanced detail, it may be seen the windings of the wire lengths 72 around the second fitting end 66a are locked in place by sleeve 70a, with the guard 50 being secured to the body of the fitting 60a. The ends of the wire lengths 72 may be spliced as shown at 80a-b such that the wires 30 may pass through the sleeve 70a as electrical leads 82a-b. The leads 82a-b are thereby connectable to a power supply to provide the power to resistively heat the assembly 10. Looking now to FIG. 4 wherein sleeve 70b and the associated hose end 18 and fitting 60b are shown in enhanced detail, at the other end of the assembly 10 the ends of the wire lengths 74a-b may be spliced, as at 84, under the overmolding 70b to complete the electrical circuit through the assembly 10.

Figure 5A:
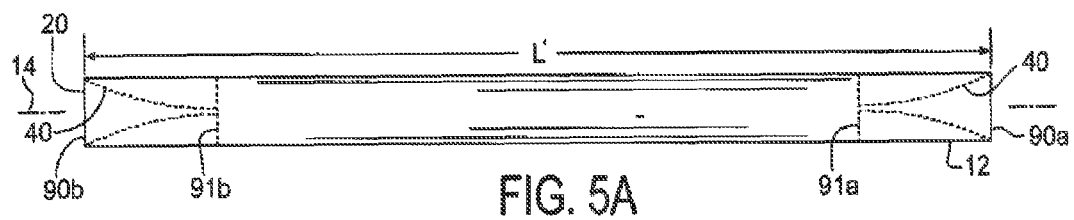
FIGS. 5A-C are a progression of side elevational views, some partially in cut-away or cross-section, illustrative of a representative method for constructing the electrically-heated hose assembly of FIG. 1.
Figure 5B:
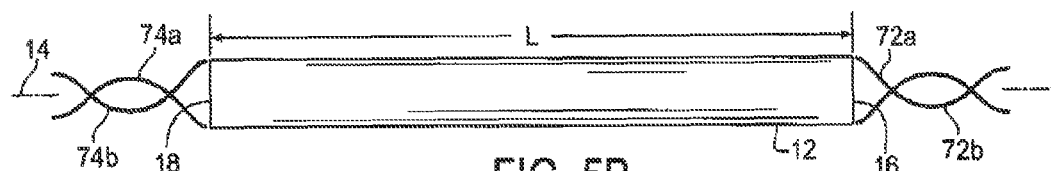
Figure 5C:
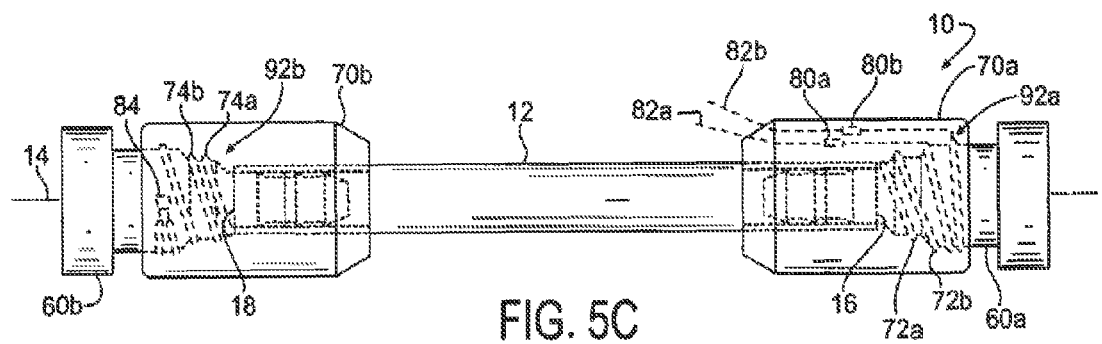

Looking lastly to the progression of views shown in FIGS. 5A-C wherein a representative method for the manufacture of assembly 10 is depicted, the method begins as in FIG. 5A with providing hose 12 which has been cut to an intermediate length, referenced at L', which is longer than the final length L (FIG. 1) of the assembly 10. Such intermediate length extends between a first intermediate hose end, 90a, and a second intermediate hose end, 90b. At each of the ends 90a-b, jacket 40 is skived back as represented at 91a-b.

Continuing on to FIG. 5B, with the jacket 40 being skived back and removed, core tube 20 (FIG. 5A) may be cut at each of the ends 90a-b to dimension the hose 12 to the final length L between the hose ends 16 and 18. As so dimensioned, the wire lengths 72a-b and 74a-b may be recovered from the longer intermediate length L' of hose 10. Proceeding lastly to FIG. 5C, with a corresponding one of the fittings 60a-b being inserted into a corresponding one of the hose ends 16 and 18, the lengths 72 and 74 may be wound as at 92a-b around the second fitting ends 66a-b, with each of the overmoldings 70a-b then being molded or otherwise formed around a corresponding one of the windings 92. Advantageously, the overmoldings 70 have been observed to increase the durability of the fittings 60 insofar as the torque required to induce a side load failure is significantly increased.

Thus, an electrically-heated hose assembly is described which is economical to manufacture and which may be easily adapted to meet a variety of heat input specifications.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A method of making an electrically-heated hose assembly having a final length, the method comprising the steps of:
    (a) providing a hose comprising:
        a core tube;
        at least a pair of spiral wound wires surrounding the core; and
        a jacket surrounding the core tube; and
    (b) cutting the hose to an intermediate length longer than the final length, the intermediate length of the hose extending between a first intermediate hose end and a second intermediate hose end;
    (c) skiving back the jacket from each of the first and the second intermediate end of the hose;
    (d) cutting the core tube to dimension the hose to the final length, the final length of the hose extending between a first final hose end and a second final hose end, and each of the wires having a length of a first wire end adjacent the first final hose end and a length of a second wire end adjacent the second final hose end, each of the lengths of the first and the second wire ends being longer than the adjacent final hose end;
    (e) providing a first and a second fitting each comprising a generally tubular body having a first fitting end and a second fitting end;
    (f) receiving the first fitting end of each of the first and the second fitting within a corresponding one of the first and the second final hose end, the second fitting end of each of the first and the second fitting extending beyond the corresponding one of the first and the second final hose end; and
    (g) winding at least a portion of the lengths of each of the first and the second wire ends of each of the wires around at least a portion of the second fitting end of a corresponding one of the first and the second fitting.

2. The method of claim 1 further comprising the additional step of:
    (h) forming a sleeve around the portion of the length of wires wound around the second fitting end of at least one of the first and the second fitting.

3. The method of claim 2 wherein the sleeve is formed as a plastic overmolding.

4. The method of claim 1 wherein the core tube is formed of one or more layers of a polymeric material.

5. The method of claim 4 wherein the polymeric material forming each of the layers of the core tube is selected, independently, from the group consisting of polyamides, polyesters, polyacetals, ethylene vinyl alcohol, polyoxymethylene, polyolefins, silicones, fluoropolymers, polyvinyl chlorides, polyurethanes, thermoplastic elastomers, EPDM, natural and synthetic rubbers, and copolymers and blends thereof.

6. The method of claim 1 wherein the jacket is formed of one or more layers of a polymeric material.

7. The method of claim 6 wherein the polymeric material forming each of the layers of the jacket is selected, independently, from the group consisting of polyamides, polyesters, polyacetals, ethylene vinyl alcohol, polyoxymethylene, polyolefins, silicones, fluoropolymers, polyvinyl chlorides, polyurethanes, thermoplastic elastomers, EPDM, natural and synthetic rubbers, and copolymers and blends thereof.

8. The method of claim 1 further comprising the additional step of:
    (h) connecting the second wire end of each of the wires to the second wire end of the other one of the wires at a splice.

9. The method of claim 8 further comprising the additional step of:
    (i) forming a sleeve around the splice.

10. The method of claim 1 wherein the first wire end of each of the wires extends in step (g) beyond the second end of the body of the first fitting to form with the first wire end of the other one of the wires a pair of electrical leads.

11. The method of claim 10 further comprising the additional step of:
    (h) forming a sleeve around the portion of the length of wires wound around the second fitting end of the first fitting, the electrical leads formed by the first wire ends extending through the sleeve.

* * * * *